United States Patent [19]

Tambini et al.

[11] 4,027,530

[45] June 7, 1977

[54] SIMPLIFIED APPARATUS FOR AND METHOD OF TIGHTENING FASTENERS

[75] Inventors: Angelo L. Tambini, Rathfarnham, Ireland; Paul W. Wallace, Warrington, Pa.

[73] Assignee: Standard Pressed Steel Co., Jenkintown, Pa.

[22] Filed: Mar. 31, 1976

[21] Appl. No.: 672,093

[52] U.S. Cl. ................................................ 73/88 F

[51] Int. Cl.² ........................................... G01N 3/22

[58] Field of Search .............. 73/88 F, 139; 173/12; 81/52.4 R

[56] References Cited

UNITED STATES PATENTS

| | | | |
|---|---|---|---|
| 3,643,501 | 2/1972 | Pauley | 73/88 F X |
| 3,693,726 | 9/1972 | Hornig et al. | 73/88 F X |
| 3,962,910 | 6/1976 | Spyridakis et al. | 73/88 F |

*Primary Examiner*—Jerry W. Myracle

*Attorney, Agent, or Firm*—Andrew L. Ney; Aaron Nerenberg

[57] ABSTRACT

The invention disclosed herein relates to a tightening system for tightening an assembly including a threaded fastener including a wrench for applying torque and imparting rotation to the fastener. Associated with the wrench is a control system including measuring means for developing a first signal representative of the angular displacement of the fastener. A second signal representative of a constant incremental time is introduced along with the first signal to gradient calculating means which develops a signal representative of the slope or gradient of an angular speed vs. angular displacement curve which could be plotted for the particular assembly being tightened. When the gradient signal falls to a predetermined percentage of a maximum previously stored gradient signal, at the yield point of the assembly or some similarly significant point characterized by a significant change in slope on the angular speed vs. angular displacement curve, a control signal is generated stopping the tightening of the assembly.

23 Claims, 3 Drawing Figures

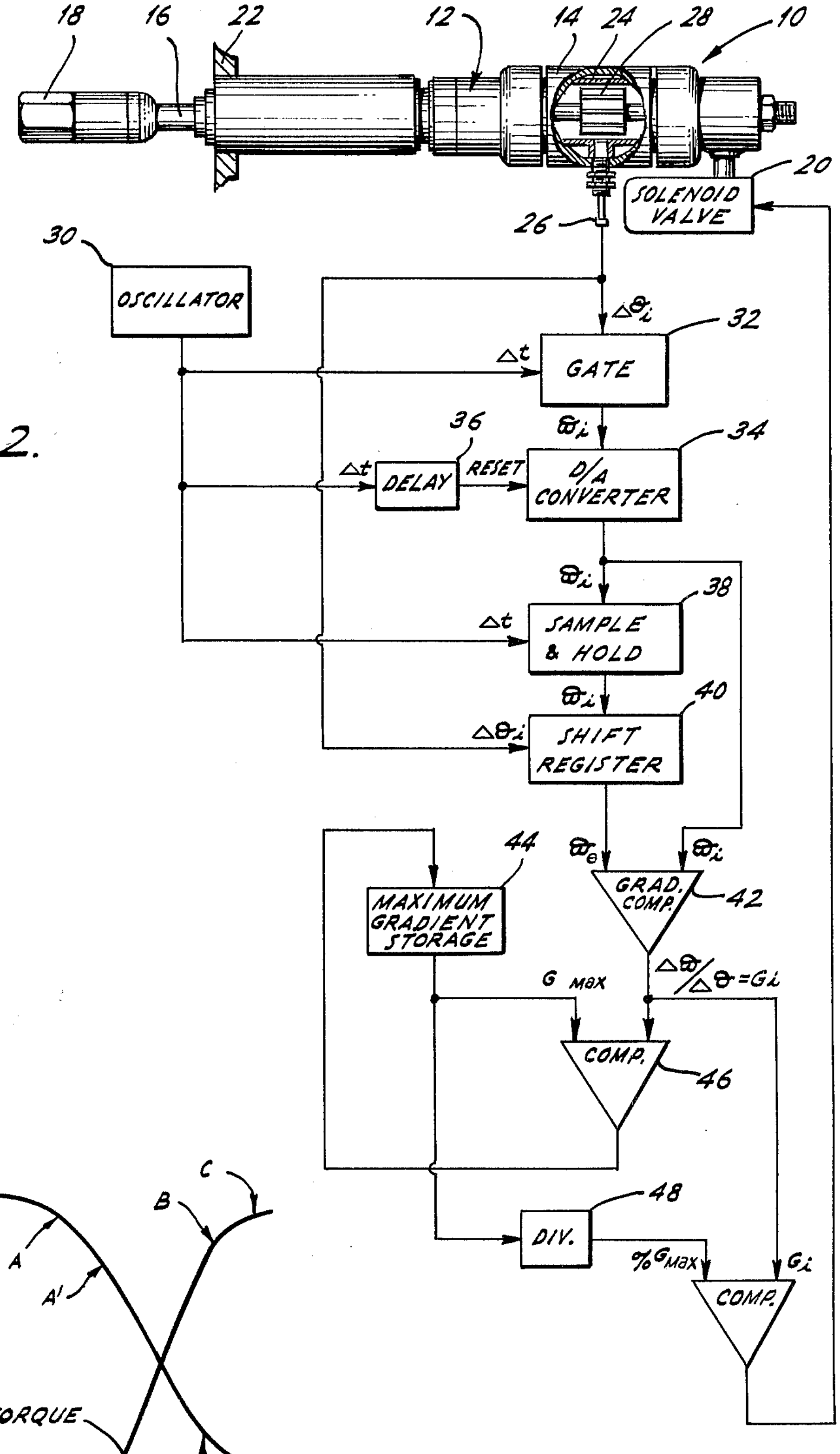
FIG. 2.
FIG. 1.
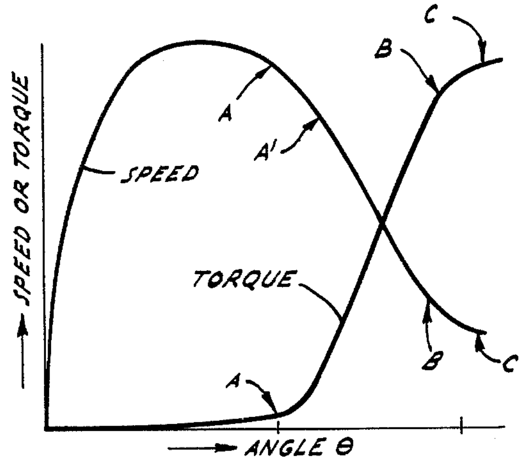

SIMPLIFIED APPARATUS FOR AND METHOD OF TIGHTENING FASTENERS

BACKGROUND OF THE INVENTION

This invention relates generally to apparatus for tightening fastener systems and, more particularly, to apparatus for tightening fastener systems to the yield point or some similarly significant point characterized by a significant change in the slope of the angular speed vs. angular displacement curve which could be plotted for the particular fastener system being tightened and corresponding to a predetermined axial load on the fastener.

In the design of structural joints secured by mechanical fastener systems, it is usual to provide for the fasteners to exert a predetermined clamping force or load on the structural members in order to insure the integrity of the point. When a joint is assembled, it is therefore desirable that the fasteners be tightened to exert a predetermined axial load on the associated structural members. However, many prior art tightening techniques for tightening threaded fasteners, such as nuts and bolts, to exert a predetermined load on associated structural members are not entirely satisfactory. For example, the most accurate tightening technique involves measuring the axial strain or stretch of the bolt while it is being tightened and relating the stretch to the stress or axial load acting on the bolt through previously calculated stress/strain relationships. While this technique is most accurate, practical applications do not usually permit measurement of the stretch of the bolt and, in those instances where the stretch can be measured, it is a time consuming and relatively expensive technique. Accordingly, this technique is used in comparatively few applications outside of laboratory testing.

Another known tightening technique that is commonly used in assembling the majority of joints involves the use of torque control tools, which indicate when the torque applied to the fastener equals or exceeds a predetermined value, and stopping tightening of the fastener in response thereto. Torque measurement is comparatively easy and since torque is related to the axial force induced in the fastener assembly, and exerted on the structural members, a predetermined torque value can be selected to theoretically correspond to the predetermined clamp load specified for the joint. However, when tightening threaded fasteners in an assembly line type of operation, wide variations of the actual torque-load relationship are experienced. These variations are caused by a variety of factors including allowable tolerance variations in the dimensions and strength of the fasteners and structural members, and lubrication or absence thereof on the mating surfaces of the fasteners and/or the structural members. All of these factors can cause large variations in the coefficient of friction between the mating surfaces of the fastener and the joint. In actual practice, variations of up to plus or minus 30% in the axial load on the bolts used for a particular application can be experienced at the same torque level. Accordingly, the torque control technique is not very accurate.

In an effort to overcome the problems associated with the prior art tightening systems, other tightening systems have been developed that include the use of tools measuring both the torque and angular displacement, or rotation, of a fastener during the tightening cycle. These tightening systems contain control systems operative in response to the torque and angle measurements to determine when the slope of a torque-rotation curve for the fastener indicates that the yield point of the fastener has been reached, and to then stop tightening the fastener. Neither the techniques nor the tools disclosed in the prior art patents are generally satisfactory for accomplishing the desired objective because they are not adaptive systems. That is, in one instance it is necessary to know in advance the actual torque-rotation relationship for the particular fastener being tightened, and in another instance it is necessary to know in advance the value of the torque gradient at the yield point. The torque-rotation relationship varies over a wide range for the same reasons that the torque-load relationship varies and, accordingly, the techniques and tools disclosed in the noted patents can be utilized only where the characteristics of the joint assembly are known in advance, and average relationships must be predetermined and utilized in the operation of the tools. Thus the versatility and accuracy of the techniques and tools disclosed in the prior art patents are not fully satisfactory.

Another tightening system is disclosed in U.S. U.S. Pat. No. 3,982,419 for "Apparatus For and Method of Determining Rotational or Linear Stuffness" by John T. Boys. In this system, signals of both the torque applied and angular rotation of a fastener are measured during the tightening cycle in order to develop a signal indicative of the gradient of the torque-rotation curve which could be plotted for the fastener being tightened. An instantaneous gradient signal is compared with a stored gradient signal and the tightening system is shut off in response thereto. The present invention is an improvement over the above-described system in that the present system does not require torque measurements obtained from the wrench means, as is disclosed in the above-identified application. The present control system utilizes a relatively inexpensive oscillator, which is not connected to the wrench means, for providing a second input parameter, time, which, along with the measured angular displacement signals from the wrench means, are used to provide a signal indicative of the angular speed of the wrench means and concurrently the fastener being driven. The gradient of the angular speed vs. angular displacement curve is used for controlling the operation of the present tightening system. The control system of the present invention must be used with a tightening system motor which exhibits a linear torque-speed relationship, as will be more fully described in the description of the preferred embodiment.

SUMMARY OF THE INVENTION

Accordingly, it is a general purpose and object of the present invention to provide a tightening system for accurately tightening a fastener system to its yield point or a similarly significant point indicative of a significant change in slope on a curve plotted for various tightening characteristics and corresponding to a predetermined axial load.

It is yet another object of this invention to provide a tightening system for accurately tightening a fastener system to its yield point or a similarly significant point indicative of a significant change in slope on an angular speed vs. angular displacement curve and corresponding to a predetermined axial load.

It is still another object of this invention to provide a tightening system for accurately tightening a fastener system to a predetermined axial load with minimum prior knowledge of the particular joint being assembled.

Finally, it is an object of this invention to provide a tightening system that is versatile, reliable, economical and accurate.

These and other objects of the present invention are accomplished by providing a tightening system including wrench means for imparting angular rotation to a fastener member included in a fastener system associated with the joint being assembled. Measuring means associated with the wrench means develop a signal representative of the angular displacement of the fastener. A signal representative of the angular speed of the fastener member is also developed. The two signals are fed to gradient calculating means where a signal representative of the instantaneous gradient of a curve which could be plotted for the angular speed vs. angular displacement relationship of the particular fastener system being tightened is developed. The tightening system further includes means responsive to the instantaneous gradient signal for determining the yield point or other similar significant point indicative of a significant change in slope on the angular speed vs. angular displacement curve through which the fastener system is being tightened and for developing a control signal at that point.

BRIEF DESCRIPTION OF THE DRAWINGS

FIG. 1 is a plot of a curve illustrating the characteristics of a typical angular speed vs. angular displacement relationship, and a corresponding torque vs. angular displacement relationship experienced by a fastener during a tightening cycle, illustrating the underlying principle of the invention;

FIG. 2 is a schematic drawing of an embodiment of a tightening and control system constructed in accordance with the present invention.

DESCRIPTION OF THE PREFERRED EMBODIMENT

Figure 3:
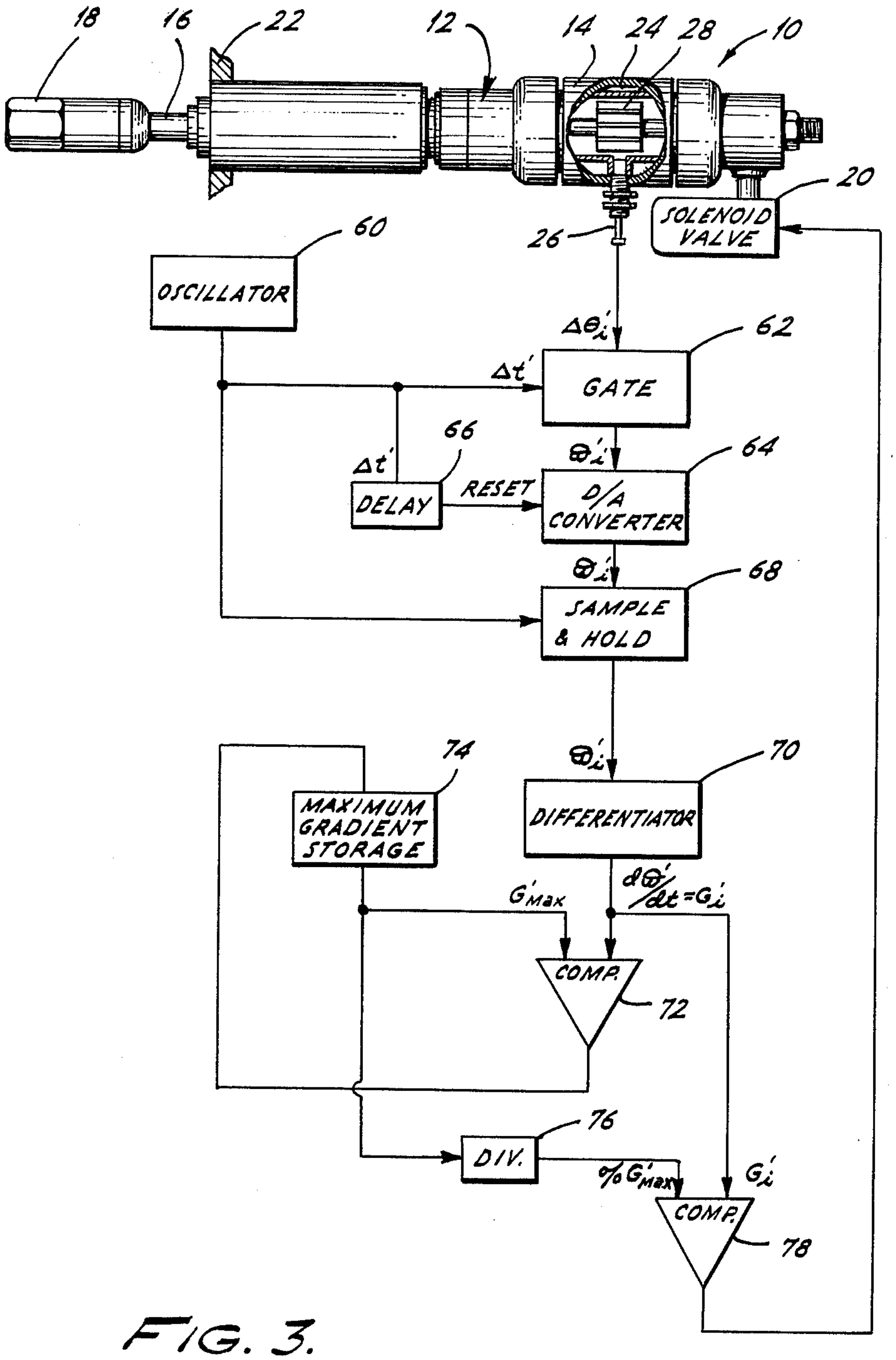
FIG. 3 is an embodiment of another form of a tightening and control system constructed in accordance with the present invention.

Referring to FIG. 1, there is illustrated a typical angular speed vs. angular displacement curve and a torque vs. angular displacement curve for a threaded fastener system being tightened. Angular speed and torque are plotted along the vertical axis and angular displacement is plotted along the horizontal axis. The curve includes an initial or pretightening region extending from the intersection of the axes to point A on both the speed and torque curves. Point A approximates the beginning of a generally linear portion of the curve known as the tightening region. In the pretightening region, mating threads of the fastener assembly have been engaged and the fastener is being rotated, but the bearing face of the rotating fastener has not yet contacted the adjacent face of the structural member included in the joint. At approximately point A on the curve, the structural members have been pulled together by the fastener assembly and actual tightening of the joint commences. For a proper understanding of the invention, it should be noted that the torque vs. angular displacement curve is shown in FIG. 1 superimposed on the angular speed vs. angular displacement curve merely for purposes of explanation. No means are disclosed for measuring torque in the present invention, as torque measurement is not necessary to practice the invention. The torque vs. angular displacement curve shown in FIG. 1 was obtained using external conventional measuring means (not shown). The torque at point A is commonly referred to in the art of the "snug" torque. It is significant to note that the occurrence of Point A on the torque curve corresponds generally to the start of the drop-off in angular speed with respect to the angular displacement of the fastener. In the tightening region of the curve, extending from point A to point B, which region is indicative of the axial force exerted by the fastener clamping the joint members together, the curve is generally linear, but may be slightly curved. In the event that there is curvature between points A and B, the slope of the curve will reach a typical maximum value. However, the tightening region between points A and B will hereinafter be referred to as the generally linear portion of the curve. As will be more fully explained, a point $A^1$ may be selected which lies on the generally linear portion of the angular speed vs. angular displacement curve between points A and B, and is the point in the tightening cycle at which the gradient calculating system is turned on. At point B, the limit of proportionality of the joint assembly has been exceeded and angular speed begins decreasing at a slower rate than the corresponding increase in angular displacement. By comparison, at point B on the torque vs. angular displacement curve, torque begins increasing at a slower rate than the corresponding increase in angular displacement. Thus it can be seen that the two curves exhibit similar characteristics in that significant changes in the respective slopes of the two curves occur at approximately the same angular displacement value. For purposes of this application, point B will be considered as the start of the yield region, but it should be understood that beyond point B, additional load is still induced in the joint assembly, but at a non-linear rate of increase. Point C corresponds to the yield point of the joint assembly, and while the definition of the yield point varies slightly, it can be considered to be the point beyond which strain or stretch of the bolt is not longer purely elastic. As will become apparent, a tightening system in accordance with this invention is capable of detecting yield point C on the angular speed vs. angular displacement curve or other points between point B and point C in the yield region, and responding thereto to generate a control signal. In certain applications, point B and point C may roughly correspond, but this correspondence would not affect the operation of the tightening system.

While in the preceding paragraph reference has been made to the limit of proportionality and yield point of the joint assembly, it should be noted that because of customary design criteria, these terms generally apply to characteristics of the fastener assembly and normally to the male fastener or bolt, since fastener assemblies are not usually as rigid as the structural members forming the joint assembly.

It should be understood that the present invention relates to a device that is capable of accurately detecting predetermined deviations from the generally linear portion of an angular speed vs. angular displacement curve, or curves of other parameters having similar shapes. It should be further understood that particular joint assemblies could include fastener systems constructed to cause the curve being plotted to deviate from linearity at some predetermined load other than the start of the material yield region. Such a deviation could be detected by the control system and used to generate a control signal. For this reason, the term yield point, as used herein, should be construed to include the yield point of the material from which the fastener is made, as well as points on a generally flattened portion of an angular speed vs. angular displacement curve generated by the configuration of the fastener at a predetermined clamping load.

Referring now to FIG. 2, there is illustrated an embodiment of a tightening system 10 in accordance with this invention. Tightening system 10 includes a wrench 12 having a motor 14, an output drive shaft 16 and a driver bit 18. Drive shaft 16 is driven by motor 14 to apply torque and impart rotation to a fastener member (not shown) engaged by driver bit 18. Wrench 12 may be any conventional type and, as is most common, motor 14 can be air powered with the flow of motive fluid being controlled by a suitable electrically operated solenoid control valve 20. It should be understood that motor 14 could also be electric, hydraulic or any combination of pneumatic, hydraulic or electric. The exact details of the wrench are not necessary for a proper understanding of the invention and, accordingly, a more specific description is not provided.

The exact details, however, of the motor characteristics must be known. In order to practice the present invention, motor 14 must be of a type that has a well defined relationship between torque and speed. This is necessary because the motor acts as a transducer, and in the case of an air powered motor, the motor should exhibit a simple linear relationship between speed and torque for a fixed air pressure. Mathematically, this can be written as, $$T = C - K\omega,$$

Where $C$ and $K$ are constants, $T$ is the output torque of the motor, and $\omega$ is the angular speed of the motor. Differentiating the above relationship with respect to angular rotation of the motor, $\theta$, yields the expression, $$dT/d\theta = -K\,(d\omega/d\theta).$$

This expression indicates that the speed gradient has a simple linear relationship with the torque gradient, and thus the speed gradient of the motor can be used in a control system in place of the torque gradient, as taught by the prior art.

Tightening system 10 and more particularly, wrench 12 is mounted to a rigid frame 22 which carries the wrench and prevents it from rotating. Mounted on drive shaft 16 for rotation therewith and preferably within motor 14, is a suitable encoder 24 that cooperates with a proximity detector 26 for developing signals representative of the incremental angular displacement or rotation of the fastener. Encoder 24 can be any of a variety of suitable devices and in this embodiment includes a series of teeth 28 formed on its outer periphery. Proximity detector 26 senses the presence of metal and, thus, the passage of the teeth and develops an electrical signal representative of predetermined increments of angular rotation. While one example of a rotation measuring device has been described, it should be understood that any of a variety of readily available devices for accomplishing the noted result can be utilized in accordance with the invention.

The embodiment of the invention shown in FIG. 2 includes a control system operatively connected to tightening system 10 for controlling the tightening of the fastener. The control system includes a gradient calculating system that determines the instantaneous gradient or slope of the angular speed vs. angular displacement curve, which could be plotted on a graph, if desired, for the particular fastener system being tightened, and developes an electrical signal representative thereof. The gradient calculating system includes a clock or adjustable oscillator 30 which may be set to begin emitting signals ($\Delta t$) when motor 14 starts operating. The time interval between signals ($\Delta t$) is constant and may be selected based upon the known output speed of the motor. Any speed within the range of output speeds of the motor can be selected as a basis for the period of signals ($\Delta t$). However, a preferred motor speed is one in the middle of the range of speeds of the characteristic speed vs. torque curve (not shown) for the particular variable speed motor being used. Approximately 200 to 250 pulses from clock 30 per each revolution of the motor output shaft, based on the free running motor speed, has been found to be an acceptable range. A gate 32 receives instantaneous incremental angular displacement pulses ($\Delta\theta_i$) from encoder 24, and outputs respective incremental angular displacement signals clocked by the constant time interval signals ($\Delta t$) from clock 30. Accordingly, the output from gate 32 is a signal representative of the instantaneous angular speed ($\omega_i$) of motor 14, and of the fastener being tightened. The signals from encoder 24, and thus the output signal from gate 32, are digital signals. In the present embodiment, analog signals are preferred for processing, and accordingly the digital angular speed output signal from gate 32 is converted to an analog signal by a digital-to-analog (D/A) converter 34. A constant time interval signal ($\Delta t$) from clock 30 is introduced into a delay circuit 36 to allow for the settling time of D/A converter 34 and to reset the D/A converter after each successive conversion is made, allowing the next digital angular speed signal to be accepted. The output from D/A converter 34 is fed into a sample and hold circuit 38, which also receives a constant time interval signal ($\Delta t$) from clock 30 controlling the sampling time. The analog angular speed signal is sampled in circuit 38 and held for a discrete period of time, and the output therefrom is fed into a conventional, multi-stage analog shift register 40 clocked by incremental angular displacement pulses ($\Delta\theta_1$) from encoder 24. Depending on the number of stages in shift register 40, its output signal represents an angular speed ($\omega_\theta$ ) a predetermined incremental angular displacement previous to the instantaneous angular displacement. A gradient comparator 42 in the form of a suitable subtraction circuit, receives output signals ($\omega_\theta$ ) from shift register 40 and signals representative of instantaneous angular speed ($\omega_i$) from D/A converter 34 and provides an output signal ($\omega_i - \omega_\theta$ over $\Delta\theta$) representative of the difference therebetween. Since angular speed signals are subtracted over fixed increments of angular displacement ($\Delta\theta$), the output signal from comparator 42 is representative of the instantaneous gradient ($G_i$) of the angular speed vs. angular displacement curve through which the fastener is being tightened.

At this point, it should once again be noted that while the angular speed vs. angular displacement curve is generally linear from point A to point B, this portion may be curved so that a typical maximum gradient value would be reached in this tightening region. Thus, the output of comparator 42, which would be a signal of constant magnitude if the angular speed vs. angular displacement curve were exactly linear from point *A* to point *B*, may experience certain changes. The gradient calculating system therefore includes circuits for determining and storing the maximum gradient ($G_{Max}$) experienced up to any point along the angular speed vs. angular displacement curve, that is, up to any point in the tightening cycle. Accordingly, a storage circuit 44 is provided, which circuit stores a signal representative of the maximum gradient ($G_{Max}$) so far encountered, and a comparator 46 is provided for comparing instantaneous gradient signals ($G_i$) with the previously stored maximum gradient signal ($G_{Max}$) from storage circuit 44. If an instantaneous gradient signal ($G_i$) is larger than a stored maximum gradient signal ($G_{Max}$), the instantaneous gradient signal is then stored in storage circuit 44. For a fuller description of storage circuit 44 and comparator circuit 46, reference is made to U.S. Pat. No. 3,982,419 for "APparatus For and Method of Determining Rotational or Linear Stiffness" by John T. Boys. The stored maximum gradient signal is then introduced into a suitable division circuit 48 where a predetermined percentage of the stored maximum gradient signal ($G_{Max}$) is obtained. For example, a value of approximately two-thirds of the maximum gradient signal ($G_{Max}$) may be selected. The selection of a two-thids value has been found to be an acceptable value to insure that the fastener system has been tightened to its yield point. The selection of point C at approximately two-thirds of the maximum gradient value insures that noise or spurious signals generated during the generally linear portion of the angular speed vs. angular displacement curve will not cause a premature shutdown of the tightening system. The proper selection of this shutoff point is important from a practical standpoint to insure that the yield point of the joint has been reached. It should further be noted that any value within the range of 25 to 75% of the maximum gradient signal ($G_{Max}$) has been found to be generally acceptable as a shut-off point. The shut-off value of the maximum gradient ($G_{Max}$) is provided by division circuit 48 and fed into a comparator 50 where it is compared with the instantaneous gradient signal (Gi) from comparator 42. When the two signals are essentially equal, a control signal is issued from comparator 50 to solenoid valve 20 shutting off the flow of fluid to wrench 12 and stopping tightening of the fastener system.

Another embodiment of the invention is shown in FIG. 3 in which the wrench and means for measuring the incremental angular displacement of the fastener are the same as in the embodiment of FIG. 2. Similar numbers in FIG. 3 therefore refer to similar parts described with respect to FIG. 2, and a description of the wrench and measuring means is therefore not included again. The control circuit shown in FIG. 3 includes an oscillator 60 similar to oscillator 30 in the embodiment of FIG. 2. Oscillator 60 may be set to begin emitting signals ($\Delta t'$) when motor 14 starts operating. The time interval between signals ($\Delta t'$) is constant and is selected as previously described. A gate 62 receives instantaneous incremental angular displacement pulses ($\Delta\theta'_i$) from encoder 24, and outputs respective incremental angular displacement signals clocked by the constant time interval signals ($\Delta t'$) from clock 60. Accordingly, the output from gate 62 is a signal representative of the instantaneous angular speed ($\omega'_i$) of motor 14. As previously described with respect to FIG. 2, the digital signals from gate 62 are converted to analog signals by a D/A converter 64, which is reset by a delay circuit 66 receiving constant time interval signals ($\Delta t'$) from clock 60. A sample and hold circuit 68 receives the output ($\omega'_i$) from D/A converter 64 and a signal ($\Delta t'$) from clock 60, and outputs a discrete angular speed signal ($\omega'_i$) to a differentiator 70, which differentiates the angular speed signal with respect to time. Consequently, the output signal from differentiator 70 ($d\omega'/dt$ or Gi) is representative of the change in angular speed over a constant time period. It should be understood at this point that the derivative of angular speed with respect to rotation could also be obtained in the manner described with respect to FIG. 2. Output signal (G'i), which is representative vs. angular displacement curve (not shown) which could be plotted for the fastener being tightened, is fed into a comparator 72 similar to comparator 42 in the embodiment of FIG. 2. The maximum gradient ($G'_{Max}$) experienced up to any point along the angular deceleration vs. angular displacement curve is stored in a storage circuit 74 similar to storage circuit 44 in the embodiment of FIG. 2. Comparator 72 compares the instantaneous gradient with the previously stored maximum gradient, and circuit 74 stores the maximum gradient determined by comparator 72. The output signal from storage circuit 74 ($G'_{Max}$) is introduced into a division circuit 76 where a predetermined percentage of the stored maximum gradient signal ($G'_{Max}$) is obtained. The previous discussion with respect to the embodiment of FIG. 2 for determining the appropriate shut off value of the maximum gradient provided by division circuit 48, is also applicable to division circit 76 in the present embodiment. The output signal from division circuit 76, which represents a percentage of the maximum stored gradient ($\%G'_{Max}$) is fed into a comparator 78 along with the instantaneous gradient signal ($G'_i$) from differentiator 70. When the two signals are essentially equal, a control signal is issued from comparator 78 to solenoid valve 20 shutting off the flow of fluid to wrench 12 and stopping tightening of the fastener system.

In both of the embodiments disclosed in this application, the angular speed of rotation of the fastener has been determined by incremental angular displacement signals measured from the rotation of the motor, and constant time interval signals from an oscillator independent from the motor. It should be understood however, that the invention is not limited to the means described in the preferred embodiments. Angular speed measurements may conveniently be obtained from any of a number of well known, conventional devices, and the signals generated by such devices, indicative of the angular speed of rotation, could be used in combination with the control systems disclosed for controlling the tightening system. It should also be noted that while FIG. 1 utilizes angular displacement for the dependent variable on the horizontal axis, time could also be used for the dependent variable. The means for producing the necessary time signals disclosed in both embodiments are oscillators 30 and 60, and thus further description or illustration is not included in the description of the preferred embodiments.

Having thus described several preferred embodiments of the invention, some of the many advantages should now be readily apparent. The tightening and control systems described herein each require minimum prior knowledge of the characteristics of a particular joint being tightened. Each control system is completely adaptive to tightening characteristics being experienced in each joint. The control systems are relatively simple and reliable, and accurately tighten each fastener system to its yield point. A relatively expensive torque cell, heretofore utilized by all of the known comparable tightening systems, is eliminated, thus making the present tightening system relatively less expensive.

While in the foregoing there have been disclosed various embodiments of a tightening system in accordance with the present invention, a number of changes and modifications should be readily apparent to one skilled in the art and are within the intended scope of the invention as recited in the claims.

What is claimed is:

1. Apparatus for tightening an assembly including a fastener member to a predetermined tightened condition comprising:

means for imparting angular motion to said fastener member;

means for measuring the angular displacement of said fastener member and providing a signal indicative thereof;

means for providing a signal indicative of the angular speed of said fastener member;

gradient calculating means receiving said angular displacement signal and said angular speed signal for developing a signal representative of the instantaneous gradient of the angular speed vs. angular displacement curve through which said assembly is being tightened; and control means responsive to said gradient signal for determining the yield point or other similar significant point indicative of a significant change in slope on said curve and for developing a control signal when said assembly is tightened to said point.

2. Apparatus for tightening an assembly in accordance with claim 1 wherein said means for providing a signal indicative of the angular speed of said fastener member includes means for providing a signal representative of incremental time.

3. Apparatus for tightening an assembly in accordance with claim 2 wherein said gradient calculating means includes means receiving said angular displacement signal and said incremental time signal for developing said signal representative of the angular speed of said fastener, and means receiving said angular speed signal and said angular displacement signal for developing said instantaneous gradient signal.

4. Apparatus for tightening an assembly in accordance with claim 2 wherein each of said incremental time signals are developed at equally spaced time intervals.

5. Apparatus for tightening an assembly in accordance with claim 1 wherein said control means includes means for storing a signal representative of the gradient of the angular speed vs. angular displacement curve throughout the tightening region thereof and for developing said control signal when said instantaneous gradient signal has a predetermined relationship relative to said stored signal.

6. Apparatus for tightening an assembly in accordance with claim 5 wherein said stored signal is representative of the maximum gradient of said angular speed vs. angular displacement curve.

7. Apparatus for tightening an assembly in accordance with claim 6 wherein said control signal is developed when said instantaneous gradient signal is approximately two-thirds of said maximum gradient signal.

8. Apparatus for tightening an assembly in accordance with claim 6 wherein said control signal is developed when said instantaneous gradient signal is between approximately 25 to 75% of said maximum gradient signal.

9. Apparatus for tightening an assembly in accordance with claim 1 wherein said gradient calculating means includes means for differentiating said instantaneous gradient signal and developing a signal representative of the derivative of the gradient of the angular speed vs. angular displacement curve, and wherein said control means is responsive to said differentiated signal and develops said control signal when said assembly is tightened to said point.

10. Apparatus for tightening an assembly in accordance with claim 9 wherein said means for providing a signal indicative of the angular speed of said fastener member including means for providing a signal representative of incremental time.

11. Apparatus for tightening an assembly in accordance with claim 10 wherein said gradient calculating means includes means receiving said angular displacement signal and said incremental time signal for developing said signal representative of the angular speed of said fastener, and means receiving said angular speed signal and said angular displacement signal for developing said instantaneous gradient signal.

12. Apparatus for tightening an assembly in accordance with claim 9 wherein said control means includes means for storing said signal representative of the derivative of the gradient of the angular speed vs. angular displacement curve throughout the tightening region thereof and for developing said control signal when said differentiating instantaneous gradient signal has a predetermined relationship relative to said stored signal.

13. Apparatus for tightening an assembly in accordance with claim 12 wherein said stored signal is representative of the maximum derivative of the gradient of said angular speed vs. angular displacement curve.

14. Apparatus for tightening an assembly in accordance with claim 13 wherein said control signal is developed when said differentiated instantaneous gradient signal is approximately two-thirds of the maximum derivative of said gradient signal.

15. Apparatus for tightening an assembly in accordance with claim 13 wherein said control signal is derived when said instantaneous gradient signal is between approximately 25 to 75% of said maximum gradient signal.

16. Apparatus for tightening an assembly in accordance with claim 10 wherein each of said incremental time signals are developed at equally spaced time intervals.

17. A method of tightening an assembly including a threaded fastener to a predetermined tightened condition comprising the steps of:

imparting angular motion to said fastener;

measuring the angular displacement of said fastener and providing a signal indicative thereof;

developing a signal indicative of the angular speed of said fastener;

developing a signal representative of the instantaneous gradient of the angular speed vs. angular displacement curve through which said fastener is being tightened; and determining the yield point or similarly significant point indicative of a significant change in slope of said curve, responsive to said gradient signal, and developing a control signal when said assembly is tightened to said point.

18. A method of tightening an assembly in accordance with claim 17 wherein said angular speed signal is developed from incremental time signals and said angular displacement signals.

19. A method of tightening an assembly in accordance with claim 17 further comprising the steps of:

storing a signal representative of the gradient of the angular speed vs. angular displacement curve through the tightening region thereof; and developing said control signal when said instantaneous gradient signal has a predetermined relationship relative to said stored signal.

20. A method of tightening an assembly in accordance with claim 19 wherein said stored signal is representative of the maximum gradient of said angular speed vs. angular displacement curve.

21. A method of tightening an assembly in accordance with claim 20 wherein said control signal is developed with said instantaneous gradient signal is approximately two-thirds of said maximum gradient signal.

22. A method of tightening an assembly in accordance with claim 20 wherein said control signal is developed when said instantaneous gradient signal is between approximately 25 to 75% of said maximum gradient signal.

23. A method of tightening an assembly in accordance with claim 17 wherein each of said incremental time signals are developed at equally spaced time intervals.

* * * * *